June 9, 1953  J. L. MEADOWS ET AL  2,641,572
DETHIOLIZING HYDROCARBONS
Filed Nov. 30, 1951

INVENTORS
JAMES L. MEADOWS
ROBERT H. HOWELL
BY AMBROSE J. STARTZ
GORDON H. MILLER.
ATTORNEYS

Patented June 9, 1953

2,641,572

UNITED STATES PATENT OFFICE 2,641,572

DETHIOLIZING HYDROCARBONS

James L. Meadows, Robert H. Howell, Ambrose J. Startz, and Gordon H. Miller, Port Arthur, Tex., assignors to The Texas Company, New York, N. Y., a corporation of Delaware Application November 30, 1951, Serial No. 259,178

7 Claims. (Cl. 196—32)

This invention relates to certain improvements in the treatment of hydrocarbons with solutions of glycol ethers and alkali metal hydroxides to effect dethiolizing of the hydrocarbons.

Solutions of alkali metal hydroxides in glycol ethers are very effective in accomplishing the removal of mercaptans particularly the higher molecular weight and more difficultly removable mercaptans from petroleum distillates, such as gasoline or naphtha and kerosene. By treating with the glycol ether solution it is possible to obtain complete removal of the mercaptans in cases where it is impossible to obtain such removal by treating with aqueous alkali metal hydroxide in the absence of the glycol ether. However, the very characteristic of the glycol ether in being soluble in both the hydrocarbon and the aqueous hydroxide, which is no doubt the reason for its effectiveness in mercaptan removal, presents a disadvantage due to loss of the solvent in both the treated distillate and the spent alkali which is withdrawn from the system.

The present invention seeks to prevent this loss in solvent and undertakes to provide a process in which the solvent is retained in the process for repeated reuse. In accordance with the invention hydrocarbon oil containing mercaptans is contacted with a solution of alkali metal hydroxide and glycol ether, the used treating solution is regenerated and a cyclic flow of dethiolizing solution is maintained between the dethiolizing zone and the regenerating zone for the repeated reactivation and re-use of the dethiolizer solution. There is a certain amount of consumption of the alkali metal hydroxide due to conversion to a non-titratable form as a result of neutralization by saponifiable material in the hydrocarbons and by side reactions occurring in the regeneration, and consequently it is desirable to reject from the system a relatively small quantity of the alkaline treating reagent. In accordance with the invention a portion of the dethiolizing solution is withdrawn from the dethiolizing-regenerating cycle and contacted with charging stock flowing to the treating or dethiolizing zone to thereby leach the glycol ether from the dethiolizing solution so as to reject from the system only the alkaline material. The hydrocarbon containing the absorbed glycol ether is directed to the treating or dethiolizing zone. The separated alkaline material, substantially free from glycol ether, is withdrawn from the system.

As a further feature of the invention the dethiolized hydrocarbon which is withdrawn from the treating zone is washed with water to remove the contained glycol ether as well as any traces of alkaline material that may remain in the hydrocarbon. The wash water is distilled to recover the glycol ether which is returned to the treating system.

Thus, in accordance with the invention the solvent contained in both the product hydrocarbon and in the spent alkali metal hydroxide which is to be rejected from the system is recovered and maintained in the system for repeated use.

In practicing the invention petroleum distillates particularly the lighter distillates, such as gasoline or naphtha and kerosene, are contacted with a treating reagent comprising an alkali metal hydroxide, such as sodium or potassium hydroxide, in an ether of a polyhydric alcohol, such as diethylene glycol monomethyl ether, commonly available under the name of methyl Carbitol or ethylene glycol monomethyl ether, commonly available under the name of methyl Cellosolve. The used treating solution is withdrawn from the mercaptan sulfur extractor or treating zone and regenerated by oxidation, and the reactivated reagent is recycled to the treating zone. The recycled reagent is maintained at a normality effective to accomplish the complete removal of the mercaptans and produce a sweet product. It has been found in practice that usually a normality of about 4 to 2 is effective on most distillate stocks. A relatively small portion of the dethiolizing solution is withdrawn, continuously or at intervals from the dethiolizing-regenerating cycle and contacted with the charging stock flowing to the treating or dethiolizing zone to thereby leach the glycol ether from the solution so that the alkaline material rejected from the system will be substantially free from solvent.

For the purpose of more fully disclosing the invention reference is had to the accompanying drawings wherein.

Figure 1:
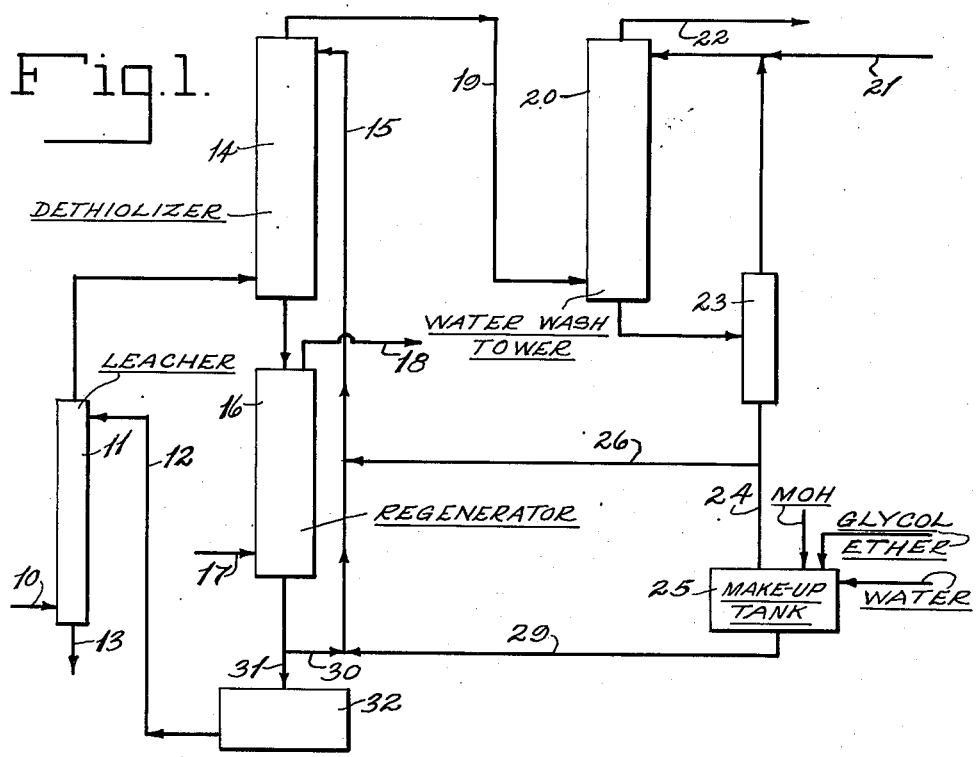
Figure 1 is a flow diagram of a preferred embodiment of the invention.

Hydrocarbon charging stock is introduced through line 10 to leaching tower 11 where it is contacted with dethiolizer solution admitted through line 12 as is hereinafter explained. The hydrocarbon leaches the glycol ether from the aqueous dethiolizer solution and the alkaline material is withdrawn through line 13. The charging stock with glycol ether absorbed from the dethiolizer solution passes to a mercaptan sulfur extraction zone 14 wherein it is contacted with dethiolizer solution admitted through line 15. The extraction or treating zone 14 may consist of a single countercurrent tower or of a plurality of units for successive stage treatment to obtain effective contacting between the hydrocarbon and the dethiolizer reagent. The used treating solution is directed to a regenerator 16 wherein it is subjected to oxidation with air or oxygen admitted through line 17; the spent oxidizing fluid is removed through line 18. The dethiolized hydrocarbon containing some glycol ether passes through line 19 to a washing tower 20 to which water is charged through line 21. The hydrocarbon, free from glycol ether flows out through line 22. The water containing the absorbed glycol ether is withdrawn to a stripping still 23 wherein the water is distilled overhead, the water vapors being condensed and the condensate recycled to the wash tower 20. It is advantageous to recycle the water in this manner so that any traces of solvent that may be present in the distillate are retained in the system. Very little make-up water is required. The concentrated glycol ether is withdrawn from the stripping still 23 and directed through line 24 to the solution make-up tank 25 or is sent through line 26 directly to the line 15 for introduction to the mercaptan extractor 14. Fresh alkali metal hydroxide, water and glycol ether are charged to the tank 25. Very little make-up glycol ether is required since the recovery of the solvent in the system is so complete.

Fresh dethiolizer solution is withdrawn from the tank 25 and directed through line 29 to line 15 for introduction to the extractor 14. Regenerated treating solution is regularly withdrawn from the regenerator and recycled through lines 30 and 15 to the mercaptan removal step. A relatively small portion of the regenerated dethiolizer solution is passed through line 31 to tank 32 from which it is withdrawn through line 12 to the leacher 11.

The system of Figure 1 is advantageously operated in a semi-continuous manner. Thus, fresh dethiolizer solution together with recycle solution from the regenerator is regularly contacted with the hydrocarbon in the treating zone 14. At the beginning of a run, a strong solution of dethiolizer is employed, such as having a normality of 4 or higher and the operation is continued to a point at which the solution will barely remove all the mercaptan sulfur (this will ordinarily be a normality of about 2) whereupon dethiolizer solution from the regenerator is directed to the leacher for recovery of the glycol ether and for the rejection of spent caustic through line 13.

It is to be emphasized that the function of the leacher 11 is to effect the recovery of the glycol ether from the alkaline material which is being rejected from the system. The contacting of the hydrocarbon charge with the caustic solution in the leacher will accomplish some treating of the charging stock in effecting some removal of saponifiable materials, phenols, and other acidic materials but the volume of reagent being rejected from the system will be so small in relation to the charging stock that it will normally be ineffective as a real pretreating operation. On the other hand the small amount of caustic being contacted with the charge will assure that the caustic rejected from the system will be as nearly completely spent as practicable.

In a typical operation with the Figure 1 system a straight run sour naphtha is treated with a solution of potassium hydroxide and methyl Carbitol. It is ordinarily preferred to use potassium hydroxide rather than sodium hydroxide in view of the somewhat greater activity of the potassium hydroxide and since the effective use of the reagent in the process makes the higher cost of the potassium hydroxide of relatively small moment. The naphtha is charged to the leacher at the rate of 10,000 bbls. per day. Fresh dethiolizer solution is prepared in tank 25 with potassium hydroxide added at a rate of 2100 lbs. per day and water at a rate of 5.3 bbls. per day. Lean caustic solution including fresh solution and recycle solution from the regenerator is directed to the treating zone at the rate of 2000 bbls. per day. Water recovered in the stripping of the wash water from the naphtha wash tower 20 is recycled to the wash tower at the rate of 300 bbls. per day. Concentrated methyl Carbitol is withdrawn from the stripping still at a rate of 50 bbls. per day of which 30 bbls. per day is sent through line 26 to be combined with the treating solution passing to the mercaptan sulfur extractor 14 and of which 20 bbls. per day is directed to the fresh caustic make-up tank 25. Fresh dethiolizer solution is added to the recycle solution in an amount of 500 bbls. in a period of 18½ days. Dethiolizer solution from the regenerator is directed to the leacher 11 at a rate of 27 bbls. per day and spent caustic is rejected from the system at a rate of 9.6 bbls. per day, representing a KOH consumption in the extraction and regeneration steps of 0.3 gram per liter of charging stock. The sweet naphtha is withdrawn through line 22.

Figure 2:
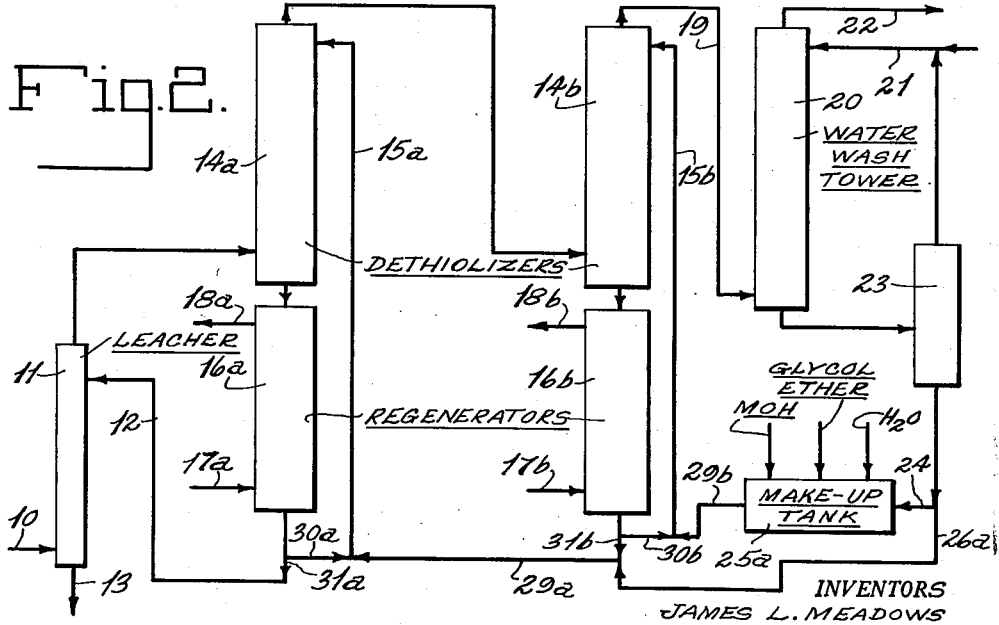
Figure 2 is a flow diagram of a modification of the process, like reference numerals indicating the same or analogous elements in the two figures.

In Figure 2 successive mercaptan extraction stages 14a and 14b are shown and each stage is provided with a separate regenerator 16a and 16b, respectively. In this system a strong treating solution is maintained in the second stage 14b and a weaker solution is maintained in the primary stage 14a. In the secondary stage (14b) the hydrocarbon is treated with a strong dethiolizer solution, such as 4 normal or higher, composed of fresh dethiolizer solution and regenerated solution from the regenerator 16b. A portion of the regenerated solution from regenerator 16b is regularly withdrawn through line 31b, mixed with recovered glycol ether conducted through line 26a from the stripping still 23 and this mixture is charged through line 29a and combined with regenerated solution withdrawn through line 30a from regenerator 16a. The total mixture is directed through line 15a to the mercaptan extractor 14a. The solution thus charged to extractor 14a will have a relatively low normality, such as 1 or 2. In this operation practically all of the saponifiable constituents, phenols, and other acidic materials are removed from the charging stock in the leacher 11 and primary extraction stage 14a so that complete removal of the mercaptans is readily effected with the strong dethiolizer solution in the secondary stage 14b.

A typical operation with the Figure 2 system is conducted in a continuous manner. Sour naphtha at the rate of 10,000 bbls. per day is charged to the leacher 11 and the naphtha containing absorbed methyl Carbitol passes to the primary extraction stage 14a, thence to the secondary extraction stage 14b. Fresh dethiolizer solution is prepared in tank 25a with potassium hydroxide added at the rate of 700 lbs. per day and water at a rate of 1.75 bbls. per day. Methyl Carbitol is withdrawn from the stripping still 23 at a rate of 50 bbls. per day of which 6.6 bbls. per day is directed to the tank 25a, and of which 43.4 bbls. per day is directed through line 26a. Dethiolizer solution having a normality of 4 is charged to the extractor 14b at the rate of 2,000 bbls. per day, being composed of recycle solution from the regenerator 16b and 8.9 bbls. per day of fresh dethiolizer solution drawn from tank 25a. In the primary treating zone dethiolizer solution having a normality of 2 is charged through line 15a to the extractor 14a at a rate of 2,000 bbls. per day, this solution being composed of recycle dethiolizer solution drawn from regenerator 16a through line 30a, and dethiolizer solution composed of a portion of the regenerated solution withdrawn from the regenerator of the secondary stage (through line 31b) and the 43.4 bbls. of methyl Carbitol recovered from the stripping still 23. Dethiolizer solution from the regenerator 16a is withdrawn from the cycle through line 31a at a rate of 8.9 bbls. per day and passes through line 12 to the leacher 11 wherein the caustic is leached from the solution by the incoming naphtha. The spent caustic is withdrawn through line 13 at a rate of 3.16 bbls. per day which represents a KOH consumption in the extraction and regeneration steps of 0.1 gram per liter of charging stock. The sweet naphtha is continuously withdrawn through line 22.

In a modification of the invention the used solution of glycol ether and alkali metal hydroxide, before being contacted with the charging stock in the leacher, is subjected to distillation to distill off a portion of the water and the concentrated solution is then contacted with the charge stock in the leacher. In this method of operation the solution of glycol ether and alkali metal hydroxide is withdrawn from tank 32 in Figure 1 operation or is withdrawn from line 31a of the Figure 2 operation and conducted to a still wherein it is subjected to distillation. The concentrated solution is directed to the leacher 11 for contacting with the charging stock. This modificiation is more completely disclosed in copending application Ser. No. 259,177 of James L. Meadows filed concurrently herewith and in the copending application of James L. Meadows, Ser. No. 336,053, filed February 10, 1953.

Although a preferred embodiment of the invention has been described herein, it will be understood that various changes and modifications may be made therein, while securing to a greater or less extent some or all of the benefits of the invention, without departing from the spirit and scope thereof.

We claim:
1. The process of dethiolizing hydrocarbons that comprises contacting the hydrocarbons in a dethiolizing zone with a solution of alkali metal hydroxide and glycol ether to effect removal of mercaptans, regenerating the used treating solution in a regenerating zone, maintaining a cyclic flow of treating solution as between the dethiolizing zone and regenerating zone, withdrawing from the dethiolizing-regenerating cycle portion of the treating solution and contacting it with hydrocarbon charging stock flowing to the system to thereby leach the glycol ether from the treating solution and withdrawing the separated alkaline material from the system.

2. The process of dethiolizing hydrocarbons that comprises contacting the hydrocarbons in a dethiolizing zone with a solution of alkali metal hydroxide and glycol ether to effect removal of mercaptans, separately withdrawing used treating solution and dethiolized hydrocarbons, regenerating the withdrawn treating solution by oxidiation, recycling regenerated treating solution to the dethiolizing zone, conducting a portion of the regenerated treating solution to a leaching zone wherein the treating solution is contacted with hydrocarbon charging stock to leach the glycol ether from the treating solution, passing the hydrocarbon charging stock containing absorbed glycol ether to the dethiolizing zone and withdrawing the separated alkaline material from the system.

3. The process of dethiolizing hydrocarbons that comprises contacting the hydrocarbons in a dethiolizing zone with a solution of alkali metal hydroxide and glycol ether to effect removal of mercaptans, separately withdrawing used treating solution and dethiolized hydrocarbons, regenerating the withdrawn treating solution by oxidation, recycling regenerated treating solution to the dethiolizing zone, conducting such operations for a period of time marked by a reduction in the normality of the treating solution, thereupon conducting a portion of the regenerated treating solution to a leaching zone wherein the treating solution is contacted with hydrocarbon charging stock to effect leaching of the glycol ether from the solution, passing the hydrocarbon charging stock containing absorbed glycol ether to the dethiolizing zone and withdrawing the separated alkaline material from the system.

4. The process of dethiolizing hydrocarbons that comprises continuously contacting the hydrocarbon in a dethiolizing zone with a solution of alkali metal hydroxide and glycol ether to effect removal of mercaptans, separately withdrawing used treating solution and dethiolized hydrocarbons, regenerating the withdrawn treating solution by oxidation, continuously recycling regenerated treating solution to the dethiolizing zone, continuously conducting a portion of the regenerated treating solution to a leaching zone wherein the treating solution is contacted with hydrocarbon charging stock, passing the hydrocarbon charging stock containing absorbed glycol ether to the dethiolizing zone and withdrawing the separated alkaline material from the system.

5. The process of dethiolizing hydrocarbon that comprises passing the hydrocarbons successively through primary and secondary dethiolizing zones, contacting the hydrocarbons in the secondary dethiolizing zone with a relatively strong solution of alkali metal hydroxide and glycol ether to effect removal of mercaptans, separately withdrawing used treating solution and dethiolized hydrocarbons from said secondary dethiolizing zone, regenerating the withdrawn treating solution by oxidation, directing regenerated treating solution to the primary dethiolizing zone wherein the hydrocarbons are contacted with the dethiolizing solution, withdrawing used treating solution from the primary dethiolizing zone, regenerating the latter treating solution by oxidation, recycling a portion of the regenerated treating solution to the primary dethiolizing zone, directing another portion thereof to a leaching zone wherein the regenerated treating solution is contacted with hydrocarbon charging stock to effect leaching of the glycol ether from the regenerated treating solution, passing the hydrocarbon charging stock containing absorbed glycol ether to the primary dethiolizing zone and withdrawing separated alkaline material from the system.

6. The process of dethiolizing hydrocarbons that comprises contacting the hydrocarbons in a dethiolizing zone with a solution of alkali metal hydroxide and glycol ether to effect removal of mercaptans, regenerating the used treating solution in a regenerating zone, maintaining a cyclic flow of treating solution as between the dethiolizing zone and a regenerating zone, withdrawing from the dethiolizinzing zone dethiolized hydrocarbon containing some glycol ether, washing said hydrocarbon with water to remove the glycol ether, subjecting the wash water containing glycol ether to distillation to separate glycol ether from water, returning the separated glycol ether to the dethiolizing-regenerating cycle, withdrawing from the dethiolizing-regenerating cycle a portion of the treating solution and contacting it with hydrocarbon charging stock flowing to the system to thereby leach the glycol ether from the treating solution and withdrawing the separated alkaline material from the system.

7. The process of dethiolizing hydrocarbons that comprises contacting the hydrocarbons in a dethiolizing zone with a solution of alkali metal hydroxide and diethylene glycol monomethyl ether to effect removal of mercaptans, regenerating the used treating solution in a regenerating zone, maintaining a cyclic flow of treating solution between the dethiolizing zone and regenerating zone, withdrawing from the dethiolizing-regenerating cycle a portion of the treating solution and contacting solution thus withdrawn with hydrocarbon charging stock flowing to the system to thereby leach the diethylene glycol monomethyl ether from the solution and withdrawing the separated alkaline material from the system.

JAMES L. MEADOWS.
ROBERT H. HOWELL.
AMBROSE J. STARTZ.
GORDON H. MILLER.